B. M. Close.

Cultivator.

No. 91,212. Patented Jun. 15, 1869.

Inventor:
B. M. Close
by his Attorney
A. Pollok

Witnesses:
W. Bailey

United States Patent Office.

B. M. CLOSE, OF WEST CAMDEN, NEW YORK.

Letters Patent No. 91,212, dated June 15, 1869.

---

IMPROVEMENT IN CULTIVATORS.

---

The Schedule referred to in these Letters Patent and making part of the same.

---

*To whom it may concern:*

Be it known that I, B. M. CLOSE, of West Camden, Oneida county, New York, have invented certain new and useful Improvements in Cultivators; and I hereby declare the following to be a full, clear, and exact description of the same, reference being had to the accompanying drawings, in which—

Figure 1:
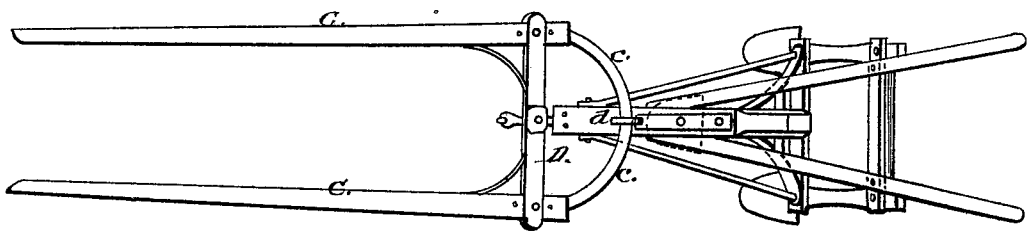
Figure 2:
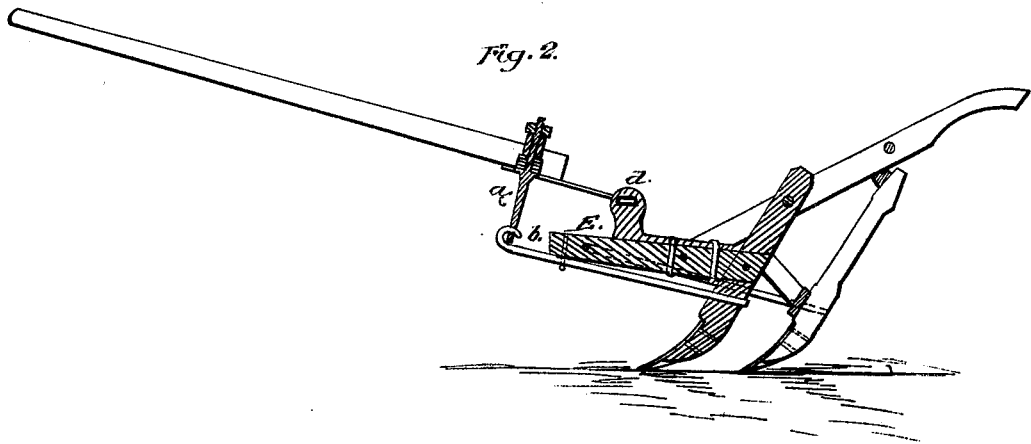

Figure 1 is a top view of a cultivator made in accordance with my invention, and Figure 2 is a longitudinal vertical section of the same.

My invention has relation more particularly to the method of uniting the thills with the frame of a cultivator; and Its object is to effect the union of the two in such manner as to allow the horse, or other draught-animal employed, the greatest liberty of movement, without interfering with the proper operation and directing of the cultivator.

To this end the invention consists—

First, in pivoting the thills to the cultivator substantially in the manner hereinafter described, so that they can swing upon said pivot in a horizontal plane, and thus allow the horse, or other animal, to turn from side to side, without necessitating the turning of the cultivator.

Second, in connecting the thills with the cultivator-frame, by what may be termed a universal joint, or so that they cannot only be swung in a horizontal plane, but also be capable of a rocking motion, to conform to the inequalities of the ground, without discomfort to the horse or other draught-animal, or interference with the proper direction of the cultivator.

To enable those skilled in the art to understand and use my invention, I will now proceed to describe the manner in which the same is or may be carried into effect, by reference to drawings hereto annexed.

The cultivator itself need not be described, as it may be of any ordinary or suitable construction.

I find, however, in practice, that by setting the standards or legs A, to which the teeth B are attached, at an angle of fifty degrees from the perpendicular, and by shaping the back teeth so as to throw the dirt outward to the right and left, the cultivator will draw with very great ease, and is not so liable to clog.

The thills C, which are braced at the rear end by the cross-bar D, in the usual manner, are pivoted to the front of the cultivator by the rod $a$, which passes down through the cross-bar D, and is connected with the beam E, by the bar $b$, or in any other suitable manner.

Upon this rod $a$ the thills can turn in a horizontal plane, from right to left, as will be seen without further explanation.

In order to limit the movement of the thills, and at the same time to afford an additional support for their rear ends, I employ the iron segment $c$, which describes a curve, having the pivotal point $a$ for its centre.

This segment passes through loop $d$, and its ends are fastened to the corresponding rear ends of the thill-frame.

The thills thus can be turned to the right or left forty-five degrees, more or less, in a horizontal plane, after which the contact of the thill-frame with the loop prevents any further movement of the thills independently of the cultivator, and the segment and loop not only have the function just described, but they also serve to maintain and hold in position the thills, and to prevent excessive strain on the pivot $a$.

At times it is desirable that the thills should not only be capable of moving, as above described, but also that they should have the capacity to rock, as for instance, when the cultivator is used on a hill-side, or on very uneven ground, and therefore, in order to attain this result, I hinge, or link, or hook the lower end of the rod $a$ to the bar $b$, as shown in the drawing, so that the rod can incline to the left or right; and in order to adapt the other parts to this new movement, the loop $d$ is made large enough, or its edges are bevelled, so as to permit the corresponding tilting of the segment-bar $c$.

Thus, at whatever inclination the rod $a$ stands, the thills can still move to the right or left, in a plane at right angles to its axis.

The segment-bar in this case sustains much of the draught.

By this means, important results are attained.

The connection of the thills to the cultivator, so that the former can move or swing to the right or left, independently of the latter, is important, as the draught-animal employed can turn to either side, as it often becomes necessary for it to do, without interfering in any way with the cultivator, or necessitating that it should follow the direction of the thills, while by arranging the thills so that they shall have both a rocking motion and a swinging motion on their axis, the greatest freedom of motion can be permitted without moving the cultivator from the proper course it is to follow.

Having now described my invention, and the manner in which the same is or may be carried into effect,

What I claim, and desire to secure by Letters Patent, is—

1. The combination, with the cultivator-frame, of the thills, pivoted to the same, substantially in the manner described, so as to be capable of swinging or turning upon their pivot from side to side, independently of the cultivator, for the purposes set forth.

2. The combination, with the pivoted thills and cultivator-frame, of the segment, and its loop, or guide, attached respectively to said thills and frame, and arranged to operate in connection therewith, substantially as and for the purposes shown and set forth.

3. The combination, with the frame of the cultivator, of the thills, the hinged pivot, or rod, on which the same turns, and the segment, and its loop, or guide, under such an arrangement that the said thill may be capable both of rocking and of being turned or swung from side to side, substantially as shown and set forth.

In testimony whereof, I have signed my name to this specification, before two subscribing witnesses.

B. M. CLOSE.

Witnesses:
   H. B. ELLER,
   WM. THOMPSON.